Aug. 29, 1939.    B. H. BROWALL    2,171,392
VARIABLE LEVERAGE MECHANISM FOR VEHICLE BRAKES
Filed Dec. 23, 1938    2 Sheets-Sheet 1
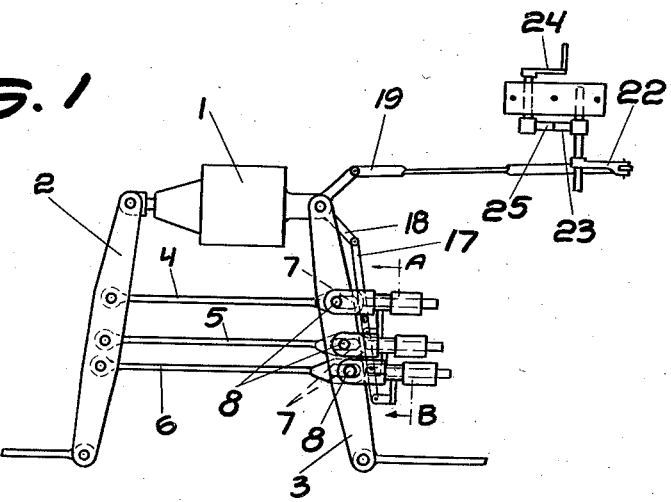
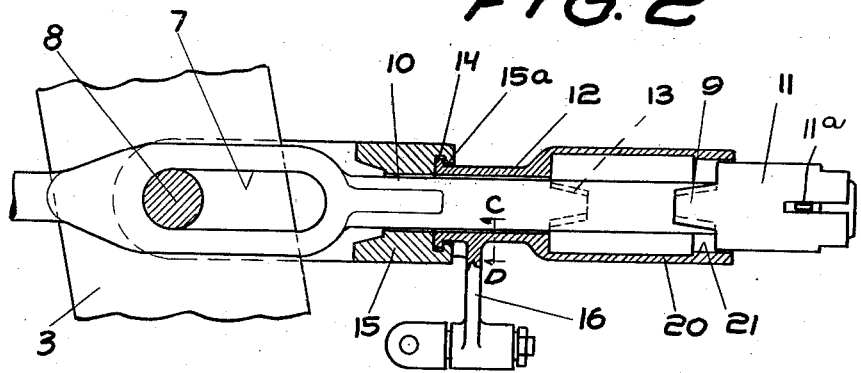
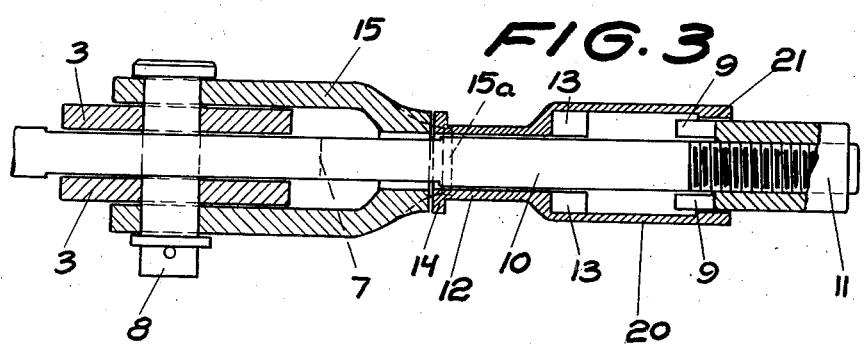
Inventor
B. H. Browall
By E. F. Wenderoth
Att'y Aug. 29, 1939.  B. H. BROWALL  2,171,392
VARIABLE LEVERAGE MECHANISM FOR VEHICLE BRAKES
Filed Dec. 23, 1938  2 Sheets-Sheet 2
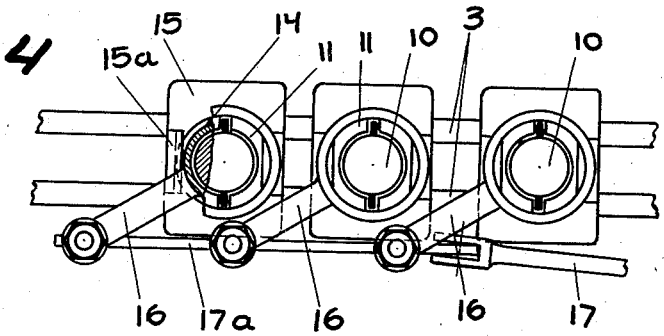
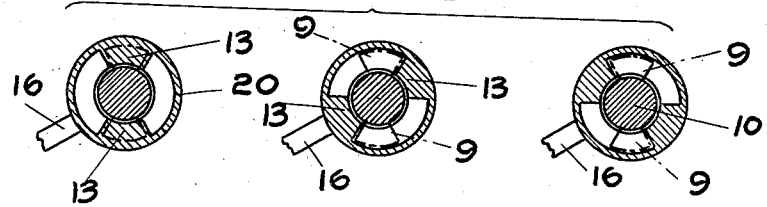
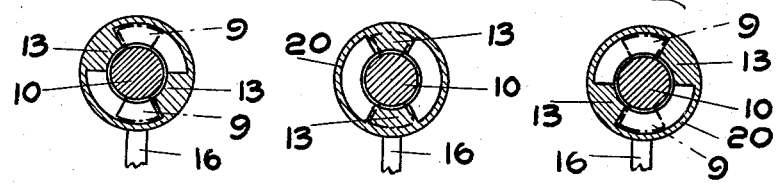
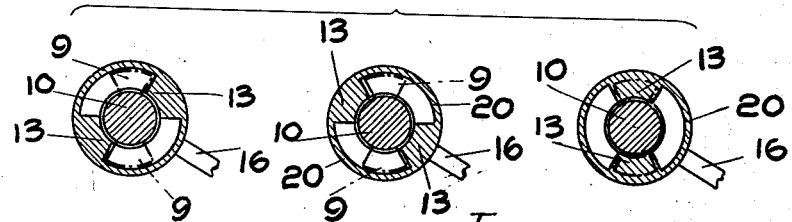
Inventor
B. H. Browall
By C. F. Wenderoth
Att'y Patented Aug. 29, 1939

2,171,392

UNITED STATES PATENT OFFICE 2,171,392

VARIABLE LEVERAGE MECHANISM FOR VEHICLE BRAKES

Bert Henry Browall, Malmo, Sweden, assignor to Svenska Aktiebolaget Bromsregulator, Malmo, Sweden, a corporation of Sweden Application December 23, 1938, Serial No. 247,501 In Germany December 31, 1937

5 Claims. (Cl. 188—195)

This invention relates to variable leverage mechanism for vehicle brakes, especially railway car brakes, of the kind by which the brake can be set on either of a number of different brake applying leverages obtainable by a corresponding number of brake lever tie rods and controllable abutments cooperating with counter-abutments for selectively rendering either of the said tie rods operative.

Especially in modern light weight high capacity cars it often is desirable to provide for more than two different brake applying leverages, for instance in addition to two brake applying leverages suited to empty and loaded car, respectively, a third brake applying leverage suited to half-loaded car. In such a case it may be unavoidable to arrange the requisite three brake lever tie rods relatively close to each other, so that there will be only relatively small spaces available for the abutment construction. Further the controllable abutments for selectively rendering either of the three brake lever tie rods operative must be so arranged that when the abutments for any one of the tie rods are set in position for rendering this tie rod operative, the abutments for the two other tie rods must be set in position for rendering both these tie rods inoperative.

One object of the invention is to provide a variable leverage mechanism for vehicle brakes of this kind, which is especially well adapted for use in brakes having more than two brake lever tie rods to be rendered operative selectively. Another object of the invention is to provide a variable leverage mechanism which is of a solid and simple construction.

With these and other objects in view, which will become apparent from the following description, the invention consists in the construction, organisation and arrangement of parts illustrated by way of examples on the accompanying drawings and hereinafter described and finally pointed out in the appendant claims.

In the accompanying drawings illustrating a preferred form of the invention, Fig. 1 is a plan view of the variable leverage mechanism applied to a conventional brake lever arrangement. Figs. 2 and 3 are two views at right angles to each other and partly in longitudinal section of a portion of one of the brake lever tie rods and parts associated therewith. Fig. 4 is an end view of the brake lever tie rods and parts associated therewith, one being shown partly in section on the line C—D in Fig. 2. Figs. 5, 6 and 7 are cross sectional views of the brake lever tie rods and the abutments associated therewith substantially on the line A—B in Fig. 1, with the controllable abutments in three different positions.

Referring to Fig. 1, 1 is the brake cylinder, 2 is the live brake lever and 3 is the dead brake lever. The two brake levers 2 and 3 are interconnected by means of three tie rods 4, 5 and 6 which are linked to the brake levers at different points and can be rendered operative selectively and for this purpose each have an idle motion that can be reduced by means of controllable abutments cooperating with counter-abutments. In the illustrated form of the invention the idle motion of each of the tie rods 4, 5 and 6 is provided for in the connection of the tie rod with the dead brake lever 3, the tie rod being provided with a long-hole 7 for a bolt 8 connecting the tie rod to the lever 3, as most clearly shown in Figs. 2 and 3. In the form of the invention shown on the drawings the counter-abutments 9 are carried on an extension 10 of each of the tie rods 4, 5, 6, projecting beyond the lever 3. The counter-abutments at each tie rod are in the form of circumferentially spaced projections 9 on the inner end of a nut 11 screwed on to the screw threaded outer end portion of the extension 10. The nut 11 is adjustable and can be locked in adjusted position by means of a pin 11a. The controllable abutments cooperating with the counter-abutments 9 are in the form of circumferentially spaced projections 13 on the outer end of a sleeve 12 which is rotatably and slidably mounted on the extension 10 between the nut 11 and the bolt 8. In the construction shown on the drawings the sleeve 12 is provided with a flange 14 engaged in two hooks 15a on the head end of a bifurcated member 15 linked at the ends of its legs to the lever 3 by means of the bolt 8 that connects the tie rod to the lever 3. The hooks 15a prevent axial displacement of the sleeve 12 in relation to the bifurcated member 15 but allow rotation of the sleeve 12 in relation to the member 15. The projections 13 forming the controllable abutments, which preferably taper towards their free ends, have the cross sectional form of diametrically opposed sectors which in the illustrative example shown extend each through an angle of 60 degrees around the axis of the sleeve 12, so that by rotation of the sleeve 12 through angles each of 60 degrees in relation to the tie rod extension 10 and the counter-abutments 9 carried thereby the abutments 13 can be set in three different positions in one of which the abutments 13 are right in front of the counter-abutments 9 and in the two other of which the abutments 13 are in front of the spaces between the abutments 9. For rotating the sleeve 12 with its abutments 13 into the said three positions it is provided with an arm 16 connected at its free end to a link 17a which in turn is linked to a link and lever system 17, 18, 19, 22, connecting the link 17a to a handle 24 through a gear 23, 25. All the sleeves 12 pertaining to the different brake lever tie rods 4, 5 and 6 can be rotated simultaneously by means of the handle 24, all the sleeves 12 having their arms 16 connected to the link 17a, as clearly shown in Fig. 4. The arrangement is such that by shifting the position of the handle 24 all the sleeves 12 simultaneously are set in either of three different positions in each of which the abutments 13 of one of the sleeves 12 are right in front of, that is in position for cooperation with, the corresponding counter-abutments 9, while the abutments 13 of the two other sleeves 12 are in front of the spaces between the corresponding counter-abutments 9 and are free to pass between them. Thus, only one of the tie rods 4, 5 and 6 is rendered operative in each of the said three positions of the sleeves 12, while the other two of the three tie rods move idly when braking. The said three different positions into which the sleeves 12 can be set are shown in Figs. 5, 6 and 7, respectively.

In order to get a better guiding of the sleeve 12 on the tie rod extension 10 the sleeve 12 is provided with an axially projecting cylindrical extension 20 of larger diameter, surrounding the abutments 13, counter-abutments 9 and nut 11, and this extension 20 is provided at its free end with an internal guiding surface 21 cooperating with the nut 11. Arranged in this way the extension 20 also forms an enclosure and seal for preventing access of dirt and other foreign bodies to the abutments.

As will be seen from the drawings the members 11 and 12 and the abutments 9 and 13 carried thereon require but little space especially in lateral directions and for this reason easily can be arranged also in cases where the brake lever tie rods have to be placed relatively close to each other. Further it will be seen from the drawings that a simple construction of the means for setting the controllable abutments into any one of a number of predetermined different positions, corresponding to the number of brake lever tie rods, is possible also in cases where the number of brake lever tie rods is greater than two.

Though I have illustrated and described in detail one preferred form of my invention I wish it to be understood that I do not limit myself to this specific form since obviously many modifications can be made therein without departing from the spirit of the invention or the scope of the appendant claims.

What I claim and desire to secure by Letters Patent is:

1. A variable leverage mechanism for vehicle brakes, especially railway car brakes, comprising a number of brake lever tie rods each having an idle motion in relation to one brake lever, two members arranged opposite to each other around the axis of each of said tie rods and movable in relation to each other through idle movement of the tie rod, one of said members being rotatable and adapted to be set in any one of a number of predetermined angular positions around said axis, corresponding to the number of said tie rods, and circumferentially distributed projections provided on said members and forming cooperating abutments so arranged that they are in front of each other and cooperate to render the tie rod operative by reducing the idle motion thereof in one of said predetermined angular positions of said rotatable member, but are free to pass between each other in any other of said positions of said rotatable member.

2. A variable leverage mechanism for vehicle brakes, especially railway car brakes, comprising a number of brake lever tie rods each having an idle motion in relation to one brake lever and being extended beyond said lever, a sleeve rotatably and slidably mounted on the extension of each of said tie rods, means connecting said sleeve to said lever so as to hold said sleeve against axial displacement in relation to said lever, means for simultaneously setting the rotatable sleeves on the extensions of all said tie rods in any one of a number of different predetermined angular positions, corresponding to the number of said tie rods, a member secured outside of said rotatable sleeve on the extension of each of said tie rods, circumferentially distributed projections provided on said member and said sleeve and forming cooperating abutments so arranged that they are in front of each other and cooperate to render the tie rod operative by reducing the idle motion thereof in one of said predetermined angular positions of said rotatable sleeve, but are free to pass between each other in any other of said positions of said rotatable sleeve, the arrangement being such that one of said tie rods is rendered operative in each of said predetermined angular positions of the rotatable sleeves.

3. A variable leverage mechanism as claimed in claim 2, in which the means for holding the rotatable sleeve against axial displacement in relation to the brake lever comprises a bifurcated member pivoted at the ends of its legs to the brake lever by means of a bolt also serving to connect the tie rod to the brake lever, the sleeve being provided with a flange rotatably engaged in hooks on the head end of the bifurcated member.

4. A variable leverage mechanism as claimed in claim 2, in which the member secured on the extension of the tie rod is in the form of a nut screwed on to the outer end of the extension, and in which the rotatable sleeve is provided with an extension surrounding the projections on the sleeve and the nut and guided on the latter.

5. A variable leverage mechanism as claimed in claim 2, in which each of the rotatable sleeves on the extensions of the tie rods is provided with an arm, and in which all these arms are linked to a link forming part of the means for simultaneously setting all the sleeves in any one of the predetermined angular positions.

BERT HENRY BROWALL.